April 19, 1966 R. I. SATTLER 3,246,903
COLLET CONSTRUCTION
Filed May 6, 1964 2 Sheets-Sheet 1
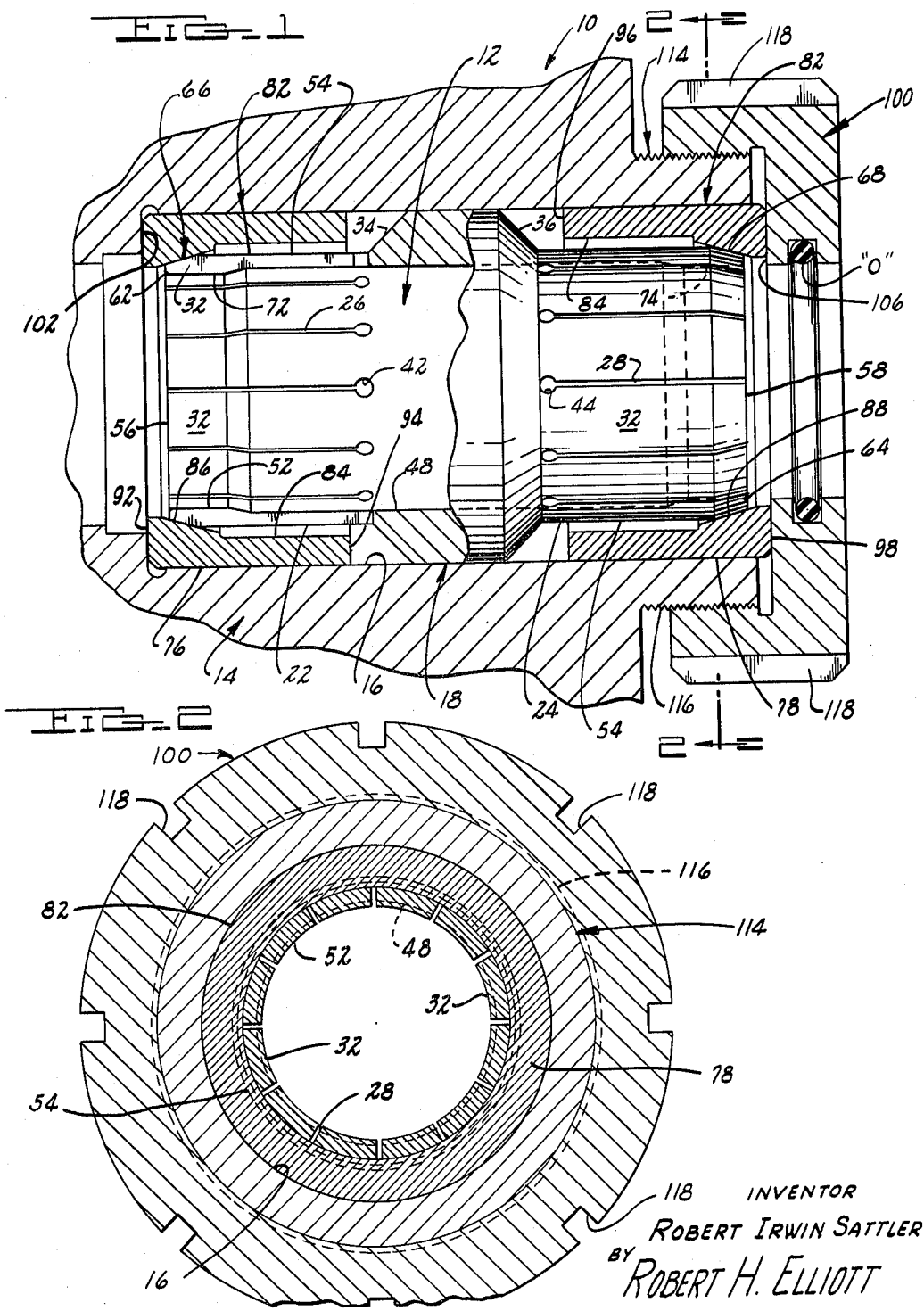
INVENTOR
ROBERT IRWIN SATTLER
BY ROBERT H. ELLIOTT April 19, 1966     R. I. SATTLER     3,246,903
COLLET CONSTRUCTION
Filed May 6, 1964     2 Sheets-Sheet 2
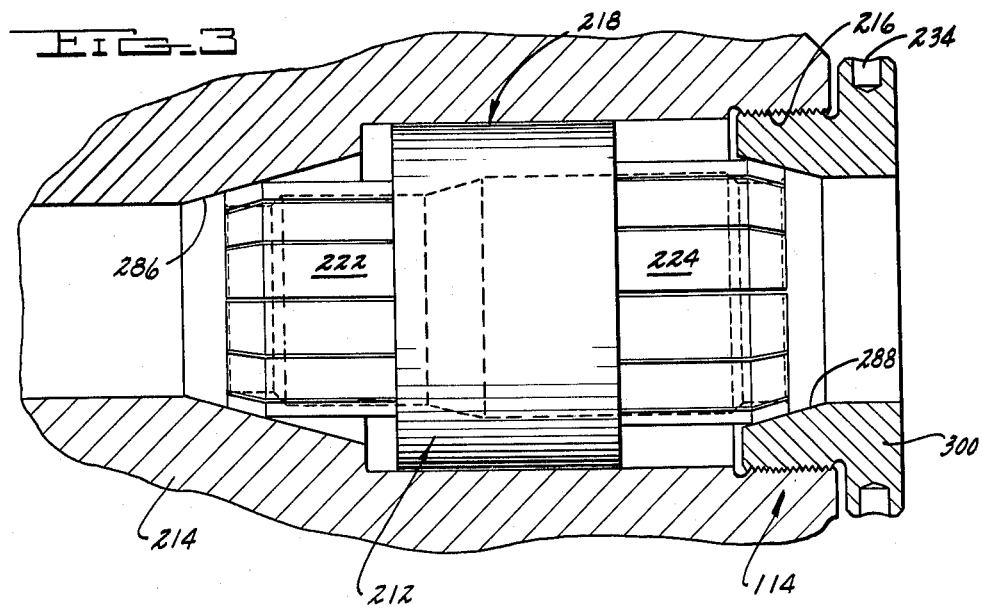
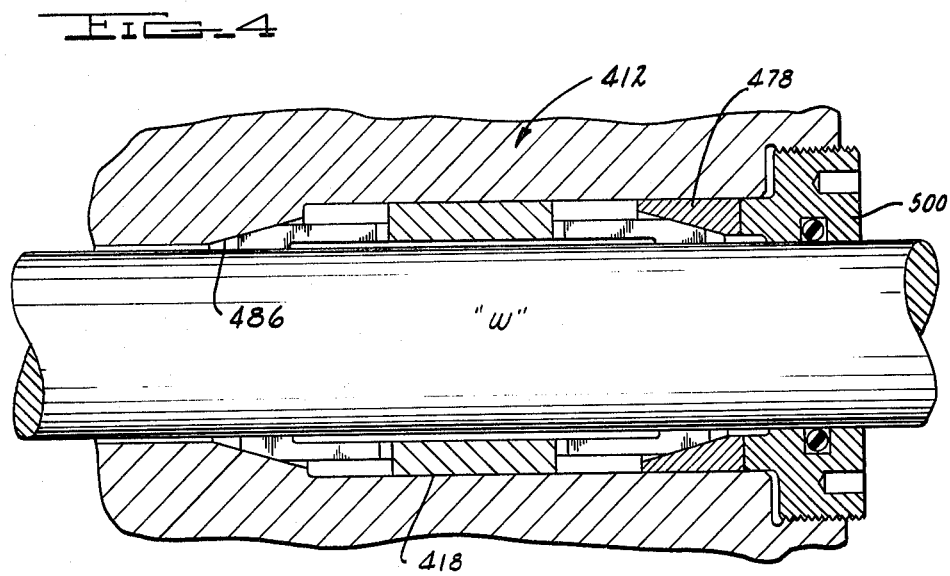
INVENTOR
ROBERT IRWIN SATTLER
BY ROBERT H. ELLIOTT United States Patent Office 3,246,903
Patented Apr. 19, 1966

3,246,903
COLLET CONSTRUCTION
Robert Irwin Sattler, St. Clair Shores, Mich., assignor to La Salle Machine Tool, Inc., Warren, Mich.
Filed May 6, 1964, Ser. No. 365,341
10 Claims. (Cl. 279—47)

The present invention relates to new and useful improvements in a collet chuck construction, and more particularly to a piloted work and tool holding collet construction which has a plurality of resilient fingered jaws at both ends thereof and an enlarged flange forming a cylindrical land pilot area on the outside diameter thereof for accurately positioning said collet within a housing, while a workpiece or tool is located on the inside diameter of said collet.

In the manufacture of various precision machine parts, it is very often necessary to use one machine for one operation and then perform a second machine operation with still another machine. When this is done, the first finish machined surface is usually used as a locating point or surface for each successive machine operation. The accuracy of all of the secondary machine operations and the ultimate quality of the finished part is therefore dependent upon the accuracy and efficiency of the clamping means used during the first and all of the successive secondary machine operations.

For the most part, collet chuck devices presently in use are used to clamp the outside diameter of very small, high production parts. When this type collet is used, bar stock is usually fed through the inside diameter of the collet automatically. The stock is then manually clamped or unclamped, as the case may be, through rotation of a draw bar located in the head stock of the machine. While this is fine for small and light weight production parts, the use of a similar type collet for larger and heavier parts presents a number of problems which are non-existent when small parts are handled. Proper alignment of the part is the most serious problem encountered and the inability to control the alignment results in the manufacture of inferior low quality parts.

In view of the above, it is a primary object of the present invention to provide a resilient collet chuck construction which is piloted within a machine housing and actuated by means of a threaded member adjacent thereto, the said collet being positive in action, simple in construction and capable of clamping the outside diameter of successive parts, quickly and accurately, using a minimum amount of labor.

Another object of the invention is the provision of a resilient collet construction wherein a cylindrical land pilot is provided on the outside diameter thereof, said cylindrical land pilot having substantially the same outside diameter as the inside diameter of the housng in which the collet is mounted, displacement of a conical sleeve member positioned adjacent to said cylindrical land pilot acting to compress said resilient collet to engage and clamp the outside diameter of a workpiece or tool shank positioned therewithin.

Still another object of the present invention is the provision of a self-centering type collet which may be adapted for use on any rotating machine tool, either for use on the tool post for clamping a tool shank or in the head stock of a machine tool for a rotating part.

Another object of the present invention is the provision of a collet chuck which can be used to clamp a workpiece or tool shank which has more than one diameter.

Still another object of the invention is the provision of a collet which can be actuated within a machine housing, using the housing and a threaded member positioned therein as an actuating device, while said collet is piloted on its outside diameter and the inside diameter of said housing.

Another object other than above mentioned relates to the provision of a collet chuck wherein the enlarged central pilot flange portion thereof is piloted in a housing, while resilient fingers having conical ends are positioned adjacent said enlarged central pilot flange, two sleeve members of generally symmetrical configuration and of substantially the same diameter as the enlarged central pilot flange are also piloted in said housing and compression of said piloted sleeve members compress said resilient fingers to engage and clamp a workpiece.

Another and most important object of the present invention is the provision of a piloted collet chuck which will uniformly engage and center a workpiece or tool shank and clamp same in a predetermined position during successive machine operations.

The foregoing and related objects can be accomplished by the provision of a collet chuck construction having a hollow housing of generally cylindrical configuration and predetermined depth; a hollow, externally flanged cylindrical collet member; a cylindrical land on said flange, said cylindrical land coaxial with the rotational axis of said generally cylindrical collet member, the outside diameter of said flange which forms the cylindrical land being substantially the same as the inside diameter of said housing; a conical portion on the outside diameter of each end of said hollow cylindrical collet member; a land of reduced diameter on the inside of each end of said collet member disposed along the rotational axis thereof; a plurality of spaced axial slots in each end of said cylindrical collet member, said slots terminating at the intersection of the external flange; a pair of hollow symmetrical sleeve members, the outside diameter being substantially the same is the inside diameter of the housing and external flange, while the inside diameter of said hollow sleeve members is substantially the same as the outside diameter of the cylindrical collet portions adjacent the external flange, the inside diameter of each of said sleeve members being provided with a conical portion on one end thereof, which is cooperable with the conical portions on the outside diameter of said hollow cylindrical collet member; when assembled said hollow sleeve members separated by said external flange; a threaded section on said housing coaxial with said cylindrical portion thereof; a hollow threaded nut, said hollow threaded nut cooperable with said threaded section on said housing, rotation of said threaded nut coaxially displaces said sleeve members in opposite directions to compress the cylindrical lands on the ends of cylindrical collet into engagement with a workpiece or tool shank, thereby centering said workpiece or tool shank and clamping same in a predetermined position, when said conical portions are placed.

Other objects of this invention will appear in the following description and appended claims, reference being had to the accompanying drawings which form a part of this specification, wherein like reference characters designate corresponding parts in the several views.

In the drawings:

FIGURE 1 is an elevational view of a multi-section collet chuck construction which embodies the present invention, portions of the drawing are broken away for purposes of clarity.

FIGURE 2 is a cross-sectional view taken along lines 2—2 of FIGURE 1 and illustrates the resilient work engaging jaws or fingers, as well as the actuating means.

FIGURE 3 is a cross-sectional view similar to FIGURE 1 and illustrates a modified form of the present invention wherein the pilot is retained to center the collet, while the actuating device is part of the housing.

FIGURE 4 is another cross-sectional view of a modified form of the invention, similar to portions shown in FIGURES 1 and 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

With reference to the drawings, FIGURE 1 represents a resilient collet chuck assembly 10 which embodies the present invention. The cylindrical collet chuck 12 is piloted in a cylindrical opening 16 in a housing 14. The collet chuck 12 is generally symmetrical in configuration with a pilot flange centrally positioned intermediate the ends thereof. The enlarged flange forms a cylindrical land pilot on the outside diameter 18 thereof which is an integral part of the collet chuck 12 and is coaxial with the cylindrical portions which extend in opposite directions therefrom. The cylindrical portions 22 and 24 are slotted and form a plurality of resilient fingers 32 which engage a workpiece or tool shank. The slots in cylindrical portion 22 are identified by numeral 26, while the slots in cylindrical portion 24 are identified by numeral 28. The slots 26 and 28 are narrow and extend axially of the cylindrical portions 22 and 24. Each of the slots 26 and 28 are of the same width and terminate in a round opening adjacent to the edges 34 and 36 of the external flange 18. The round openings are identified by numerals 42 and 44. Atlhough the slots 26 and 28 are shown in alignment, this is not a prerequisite of the invention, since the slots might be of different widths, of different number and out of alignment without departing from the spirit of the invention.

The inside diameter 52 of the cylindrical portions 22 and 24 is concentric with the outside diameter 54 thereof and square with the ends 56 and 58. The inside diameter of each of the ends 56 and 58 each have a chamfered portion 62 and 64 thereon to permit easy and rapid entry of a workpiece or tool shank, while the outside diameter 54 of each end is tapered and defines conical portions 66 and 68. It will also be noted that the central portion 48 of the inside diameter 52 is of less dimension than the hollow cylindrical land areas 72 and 74 immediately adjacent thereto. This permits the accurate alignment of a workpiece without causing localized wear within the collet 12.

Positioned about the outside diameter 54 of each of the cylindrical portions 22 and 24 are two cylindrical actuating sleeve members 76 and 78. The outside diameter 82 of each of the cylindrical sleeve members 76 and 78 is substantially the same as the outside diameter of the central pilot flange 18. The inside diameter 16 of the housing 14 is of such dimension as to receive and pilot the cylindrical actuating sleeve members 76 and 78, as well as the central pilot flange 18. While the inside diameter 84 of the cylindrical actuating sleeves 76 and 78 could be piloted on the outside diameter 54 of the collet 12, the sleeves 76 and 78 have been relieved for the reason above mentioned and only the respective conical portions 86 and 88 engage the conical portions 66 and 68. It will be noted that the ends 92 and 94 of sleeve 76 and the ends 96 and 98 of sleeve 78 are flat and square with the outside diameter 82 thereof. The end portion 92 engages the flat bottom 102 in the housing 14, while the end portion 98 engages the flat surface 106 of the threaded nut 100.

The housing 12 can of course be of any configuration and in the present instance the right hand end 114 of the housing body is threaded. The threaded portion 116 is coaxial with the cylindrical opening 16. Cooperable with the threaded portion 116 is a hollow threaded nut 100, which provides the means of displacing the cylindrical sleeve members 82 and 84. Rotation of the threaded nut 100 is accomplished by use of a spanner wrench (not shown) which cooperates with the axial slots 118 disposed in the circumference of the nut. The central part of the nut 100 generally parallel to the opening 16 in the housing 14, while the center section thereof is cut away to receive an O ring. Therefore, when a workpiece or tool shank is disposed therein and clamped, all foreign matter is excluded.

If we now review FIGURE 1 and FIGURE 2, it will be apparent that rotation of the nut 100 will displace the cylindrical actuating sleeve members 76 and 78 against surfaces 102 in the housing and 106 of the nut 100. The conical portions 66 and 68 on the collet then engage the conical portions 86 and 88 in the cylindrical sleeve members 82 and 84, thereby depressing the fingers 32 on each end of the collet 12 into engagement with a workpiece or tool shank, to clamp same securely in a predetermined position.

Looking now at FIGURE 3 of the drawings, a modified form of the present invention is illustrated. In this embodiment, the pilot flange 218 has been retained, while the cylindrical portions 222 and 224 immediately adjacent thereto are of different diameters. The separate hollow cylindrical actuating sleeve members have been eliminated and replaced by a conical section 286 in the housing 214 and a conical section 288 in the threaded nut 300. The right hand end 114 of the housing is threaded on the inside diameter 216, of the cylindrical opening therein. With this construction, a workpiece having more than one diameter can be clamped in a predetermined position. The operation of the collet 212 is the same as previously described in connection with FIGURES 1 and 2. The slotted portion of the sleeve portions 222 and 224 terminate adjacent the edges of the enlarged pilot flange 218, and while they are shown as being in alignment, need not necessarily be so positioned. A plurality of openings 234 are located in the periphery of the threaded nut 300 to permit displacement of the threaded nut when the collet chuck 212 is operated to engage a workpiece.

With reference to FIGURE 4 of the drawings, another modified form of the present invention is shown. In this view, the collet chuck 412 is the same as that described in connection with FIGURES 1 and 2, however, the actuating means employed in connection with FIGURE 4 is a combination of that used and described in connection with FIGURES 1–3 of the drawings.

A conical portion 486 is located in the housing 414, while the opposite end of the collet 412 engages a hollow actuating sleeve 478. The sleeve 478 is axially displaced through rotation of a threaded nut 500. When the nut 500, located in the housing is rotated, the sleeve 478 is moved in one direction, displacing the conical end portions of the collet chuck 412 into engagement with the workpiece W.

From the foregoing description, it is apparent that the invention is simple, durable and inexpensive. It can be manufactured using modern mass production techniques at a cost which is within the economic reach of all prospective users. The invention provides a collet chuck which is piloted within the housing in which it is used, thereby maintaining the same central at all times, as well as the workpiece or tool shank which is clamped within the collet by means of the resilient fingers formed thereon.

Having thus described my invention, I claim:

1. In a collet construction, the combination of,
a hollow cylindrical member;
an enlarged pilot flange on the outside diameter of said hollow cylindrical member;
a conical portion on each end of said hollow cylindrical member;
a plurality of axial slots disposed in each end of said hollow cylindrical member;
a pair of hollow cylindrical sleeve members having substantially the same outside diameter as said enlarged pilot flange, one of said sleeve members positioned on each end of said hollow cylindrical member and in coaxial alignment with the outside diameter of said enlarged pilot flange;

a conical portion on the inside diameter of each of said hollow sleeve members cooperable with the conical ends of said cylindrical member;

said hollow sleeve members when displaced are adapted to compress the slotted ends of said cylindrical member so as to engage and clamp a workpiece positioned therewithin.

2. In a multisection collet construction, the combination of, a hollow housing and a hollow cylindrical member;

a plurality of axial slots in each end of said cylindrical member;

a conical portion on the outside diameter of each end of said cylindrical member;

an enlarged flange forming a cylindrical land on the outside diameter of said hollow cylindrical member;

two sleeve members, one positioned over each end of said cylindrical member;

a conical portion on the inside diameter of each of said sleeve members;

a threaded portion on said housing;

a hollow threaded member cooperable with said threaded portion to displace said sleeve members and cause said cylindrical member to engage and clamp a workpiece positioned therewithin, when said enlarged flange and said sleeve members are piloted on the inside of said hollow housing.

3. In a collet chuck construction, the combination of, a hollow cylindrical member;

an enlarged flange on the outside diameter of said hollow cylindrical collet member;

a conical portion on the outside diameter of each end of said cylindrical collet member;

a plurality of spaced slots in each end of said cylindrical collet member;

a pair of hollow cylindrical sleeve members;

a conical portion on the inside diameter of each of said cylindrical sleeve members;

one of said hollow cylindrical sleeve members positioned over each end of said cylindrical collet member in co-axial relationship therewith, said conical portions in engagement;

axial displacement of said cylindrical sleeve members compressing the slotted ends of said cylindrical collet member to engage and clamp a workpiece positioned therewithin.

4. In a tool holding collet chuck, the combination of, a hollow housing of cylindrical configuration;

a hollow cylindrical collet body member in said hollow housing;

a conical portion on each end of said cylindrical collet body member;

a conical portion on the outside diameter thereof;

a plurality of spaced axial slots in each end of said cylindrical collet body member;

a pair of symmetrical sleeve members, one positioned over each end of said hollow cylindrical member, intermediate said cylindrical collet body member and said hollow cylindrical housing to form a pilot for said cylindrical collet body member;

a conical portion on the inside diameter of each of said sleeve members, which conical portion is cooperable with the conical portion on said cylindrical collet body member;

means on said housing for displacement of said piloted sleeve members to cause said sleeve members to compress the slotted ends of said cylindrical collet body member so as to engage and clamp a tool positioned therewithin.

5. A device as in claim 4, wherein said axial slots in said cylindrical collect body member are in alignment.

6. A device as in claim 4, wherein said axial slots are equally spaced and radial with respect to the rotational axis of said cylindrical collect body member.

7. In a collet construction, the combination of, a hollow cylindrical collet member positioned in a hollow cylindrical housing;

a flange on the outside diameter of said hollow cylindrical collet member, intermediate the ends thereof;

a conical portion on each end of said cylindrical collet member;

a conical portion on the inside diameter of said housing which is cooperable with one conical end on said cylindrical collet member, said flange piloted in said hollow cylindrical housing;

a sleeve member having the substantially same outside diameter as said flange and a conical portion on the inside diameter thereof which is cooperable with the conical portion on the end of said cylindrical collet member, which sleeve forms a second pilot;

means in said housing to cause displacement of said sleeve member which compresses the slotted ends of said cylindrical member to engage and clamp a workpiece positioned within said hollow cylindrical collet member.

8. In a multisection collet chuck construction, the combination of, a hollow cylindrical collet member;

an enlarged flange forming a cylindrical land on the outside diameter of said hollow cylindrical collet member;

another land on the inside diameter of each end of said hollow cylindrical collet member;

a conical portion on the outside diameter of each end of said cylindrical member;

a plurality of equally spaced slots in each end of said cylindrical collect member, said slots terminating adjacent land on the outside diameter thereof;

at least one sleeve member positioned over one end of said cylindrical collet member;

a conical portion on the inside diameter of said sleeve member, which conical portion is cooperable with one conical end on said cylindrical member;

axial displacement of said sleeve member with respect to said cylindrical collet member causes engagement of the respective conical portions thereof, which compresses at least one end of said cylindrical collet member to engage and clamp a workpiece within said hollow portion thereof.

9. In a piloted, multisection collet chuck construction, the combination of, a hollow cylindrical housing;

a hollow, externally flanged cylindrical collect member;

a cylindrical land on the outside diameter of said flange;

a conical portion on each end of said externally flanged cylindrical collet member;

a cylindrical land on the inside diameter of each end of said externally flanged cylindrical collect member;

a plurality of equally spaced axial slots in each end of said externally flanged cylindrical collet member;

a pair of symmetrical sleeve members, each of said sleeve members having a conical portion on the inside diameter thereof and positioned over each end of said externally flanged cylindrical collet member, said conical portion on the inside diameter of said sleeve members cooperable with the conical portions on the ends of said externally flanged cylindrical collet member;

said sleeve members separated by said cylindrical flange;

a threaded section on said cylindrical housing;

a hollow threaded nut, said hollow threaded nut cooperable with said threaded section on said cylindrical housing, rotation of said hollow threaded nut axially displaces said sleeve members into engagement with said conical portions to compress said cylindrical lands on the inside of said slotted, externally flanged cylindrical collet member into engagement with a workpiece positioned therein.

10. In a collet chuck construction, the combination of, a housing member having a cylindrical opening therein, said opening of predetermined depth;

a generally symmetrical and hollow, externally flanged cylindrical collet member;

a cylindrical land on said external flange, said cylindrical land coaxial with the rotational axis of said cylindrical collet member and the cylindrical opening in said housing, the outside diameter of said flange and the inside diameter of said housing being substantially the same;

a tapered portion on each end of said cylindrical collet;

a cylindrical land on the inside diameter of each end of said hollow cylindrical collet member, the lands separated by an undercut section;

a plurality of slots in each end of said cylindrical collet said slots terminating at the intersection of said external flange;

a pair of hollow symmetrical sleeve members, the outside diameter of said sleeve members being the same as the outside diameter of said flange, while the inside diameter thereof is of the same configuration as the cylindrical collet adjacent the external flange;

a threaded section on said housing coaxial with said cylindrical opening therein;

a hollow nut, said hollow nut threaded and cooperable to engage the threaded section on said housing, rotation of said nut displaces said sleeve members to clamp a workpiece positioned on the inside of said hollow cylindrical collet chuck.

References Cited by the Examiner

UNITED STATES PATENTS

| | | | |
|---|---|---|---|
| 518,175 | 4/1894 | Brooks | 279—51 |
| 1,741,734 | 12/1929 | Pannwitz | 279—51 |
| 2,672,789 | 3/1954 | Cross | 279—49 |

FOREIGN PATENTS 1,248,846  11/1960  France.

ROBERT C. RIORDON, *Primary Examiner.*

H. V. STAHLHUTH, *Assistant Examiner.*